Patented Mar. 2, 1943

2,312,807

UNITED STATES PATENT OFFICE 2,312,807

RESINOUS PRODUCT FROM CELLULOSIC SUBSTANCES

Eduard Färber, New Haven, Conn., assignor to Polyxor Chemical Co., Inc., New Haven, Conn., a corporation of New Jersey No Drawing. Application October 24 1939, Serial No. 300,983

10 Claims. (Cl. 260—9)

The present invention relates to resinous materials produced from cellulosic substances and organic acids.

The process and a resinous material, which I have produced by this process and believe to be new also, have several advantages. For example, the reaction requires no catalyst or other reaction-inducing substance; also no care need be taken to assure uniform distribution of a small quantity of additional material through the mixture of the principal reacting components as may be necessary when small quantities of a catalyst or the like are required. Again, my resinous material tends to have a higher electrical resistance and a higher dielectric strength than those previously known, due to the absence of reaction-inducing substances from it; the catalysts used customarily in resinous reactions appear at least in part in the final resinous products, and are of the class of electrolytic conductors.

Briefly, I have discovered that the cellulosic substances and certain of the high boiling wood acids can be made to react to produce resinous materials by the action of heat alone, without catalysts or other added reaction-inducers, despite the well known fact that these acidic materials are rather inert chemically.

Within the term "cellulosic substances" I here include not only cellulose and cellulose-containing materials, but also the natural products which are believed to be developed in plant life from cellulose in the more limited sense of that word such as, for example, that called lignin. For instance, taking a natural material containing, say, 30% of lignin as well as a quantity of cellulose, my process produces an apparently uniform resinous material, i. e. one which dissolves entirely without leaving a residue, thus showing that all the plant material has been transformed into resin. It will be understood accordingly that hereafter where proportions involving cellulose are mentioned, these natural cellulose products, where present, are included as though they were cellulose in its more limited sense.

The "high boiling wood acids" of my process are those resin acids that are contained in tall oil, and mixtures of such acids and those fatty acids that are contained in tall oil. Various of these acids are known. Tall oil is largely a mixture of these fatty and resin acids. Gum and wood rosins are other sources of these resin acids. The source or sources from which the acid or acids are obtained is immaterial however, so far as concerns their usability in the process of my invention. It is immaterial however whether the acidic content be in the form of a free acid or acids, or in the form of a lactone or lactones or polymerized products, or partly one and partly another or others. Generally speaking too, it is immaterial whether or not other substances be present also with the acid or acid mixture, providing of course that such substances are not deleterious or otherwise objectionable in any particular instance, as will be understood.

In carrying out my process, I may merely mix together the cellulosic substances and the high boiling wood acid or acids, in suitable proportions, and by applying heat hold the mass at a suitable temperature until the reaction is completed; and, then, when and as necessary, I separate non-resinous products, residues or surpluses from the resinous products of the reaction.

Generally speaking, the proportions of the two components are not critical. About one part of acid to one part of cellulosic substance, all by weight, is generally sufficient for complete reaction. However, an excess of acid over this amount is advantageous generally. Although the surplus does not enter into the reaction, it acts as a solvent for the resin during its formation, facilitates the penetration into the mass of the heat necessary for the reaction, and compensates for any loss of acid by evaporation during the process; any residue remaining at the completion of the reaction can be removed, say by distillation, under reduced pressure if desired or necessary, or by extraction with solvents for the acids which do not attack the resin.

A rather high temperature is necessary to bring about the reaction. In general, at atmospheric pressures, it is necessary to heat the mass to about the boiling point of the wood acids, or to about 300° C. or higher. Once the mixture reaches these temperatures, the reaction proceeds well and is finished in a few hours. The mixture, which is dry in the beginning, melts with slow evolution of vapors, mostly water, and small amounts of aldehydes and oily acids.

It is advantageous to provide for the even and rapid distribution of the applied heat throughout the mixture. For this purpose, I prefer to start with an excess of acid as indicated above; the excess can equal the quantity of acid entering into the reaction if desired, or even more than this. Also customary means for assuring even and rapid heat distribution can be employed. For example, the mixture may be pressed against the heated walls of the vessel used for the reaction; preferably the mixture is kept in rather rapid motion, as by stirring or otherwise.

Preferably also I use vessels of high thermal conductivity, and pieces of metal, say of the same kind of metal as that of which the kettle or other container is constructed, can be laid in the vessel to assist in carrying the applied heat well into the mass, or the inner surfaces of the container can be provided with attached metal ribs or other projections of metal extending into the mass, or heating pipes can be used, etc. Care should be taken however not to drive the acid from any substantial part of the cellulosic substance or substances to any considerable extent, or in some manner provision may be made for repeated or continuous intimate contact between acid and cellulosic substance for sufficient time to bring about a complete reaction.

Ordinarily cellulosic substances, when heated alone or in the presence of salts or mineral acids, start to decompose and carbonize at temperatures above 170° C., and an exothermic reaction sets in at about 250° C. with stormy evolution of gases. This does not occur in my process, even at the much higher temperatures of my process.

The new materials resulting from my process indicated above are resinous in nature, are soluble in chlorinated hydrocarbons, and/or in benzol, pinene and related solvents, and accordingly are adapted for use as varnishes or other coatings. They are generally insoluble in sodium hydroxide solutions, and are only slightly attacked by concentrated nitric acid. They are highly stable chemically, and they have great electrical resistance and dielectrical strength. They are highly water repellent, i. e. are not wet by water, which adapts them for use for water-proofing purposes. They are somewhat elastic, and are highly flexible. They are insoluble in mineral oils, which adapts them for use as varnishes or coatings to restrain the passage of mineral oils. They are quite generally inert chemically except insofar as they are soluble in common solvents as before indicated, as a result of which they are suitable for use as varnishes or coatings to protect metals and ceramic materials generally against attacks by chemicals.

Subsequent to the reaction, a resinous material formed as above described, may be polymerized further by holding it at a temperature of, say, from 330° C. to 360° C. for a short time; after first softening, it solidifies at such temperatures and in this latter state is still more resistant to solvents and chemical action. Inasmuch as the material in its initial state softens with heat, it can be molded into articles of various shapes. In its initial state, the material melts at, say, from 70° C. to 90° C., and accordingly can be cast into articles of various kinds.

As before indicated, the mass at the end of the reaction may contain non-resinous products, residues or surpluses, and these may be separated from the resin. This separation may not always be necessary however. For example, in some instances the mixture of resin and non-resin can be prepared for use as a coating, as by adding a solvent or solvents, pigments, fillers, etc., as the particular case may require.

The following are a few examples of my process and new compound that I prefer; the proportions are by weight.

I may mix about 100 parts of cellulose, or sufficient cellulose-containing material in finely divided form to provide 100 parts of cellulose, with sufficient tall oil to provide 150 parts of acid, and by applying heat hold the mass at about 300° C., at atmospheric pressure, until the reaction is completed. Some 40 to 50 parts of volatiles are evaporated. After cooling, the mass is a sticky liquid of high viscosity, dependent on the surplus of tall oil used. I may remove the non-resinous materials by adding (while the mass is still hot enough to be sufficiently liquid, or by re-heating the mass to liquify it if necessary) sufficient methanol containing, say, 5% to 10% of water to dissolve such material, preferably under stirring and heating, until the non-resinous solution separates from the remainder. This leaves about 130 to 140 parts of a dark resinous material which, in solid form, dissolves easily in, for example, carbon tetrachloride or pinene.

Ground wood can be treated in a similar manner. For example, I may mix two parts of tall oil with one part of dried ground, or otherwise finely divided, wood. I may then apply heat to hold the mass at, say, about 320° C., at atmospheric pressure, for about five to ten hours. On cooling, the mass is a heavy, viscous brown liquid, the resin being dissolved in surplus of the tall oil. I may then remove non-resinous material by distillation, or by adding solvents like methanol or acetone containing, say, 10% water to dissolve such non-resinous material (e. g. surplus oil), and allowing separation. The undissolved resinous material collects in solid form.

As a further example, I may mix 100 parts of waste paper of any kind, usually ground or otherwise finely divided, with 150 parts of tall oil. This mixing is facilitated by heating the tall oil to, say, about 100° C. before adding the oil to the paper. After the two are well mixed, I apply heat to hold the mass at about 290° C. to 315° C. until all or nearly all the fibrous paper structure has disappeared. On cooling, the mass may be a viscous liquid in which the resinous material is dissolved. Non-resinous material can be separated out by, for example, vacuum-distillation. The ultimate product is then a dark resinous material soluble in chlorinated hydrocarbons, terpenes, ketones, etc.

Generally speaking too, surplus acid can be separated from the resinous material by treating the mixture, after the reaction, with dilute solutions of alkalies in water. In the presence of large amounts of free wood acids, a part of the resin may be emulsified on mixing with the alkaline water solution. It can then be reprecipitated by neutralization of excess alkali.

It will be understood of course that the mixing of the mass, and the application of heat to the mass, need not always be separated in point of time. In proper instances, the components may be mixed together while being heated, for example by passing vapors of the acid through the carbohydrate material. In general it will be understood that my invention is not limited to the details and particular exemplifications of my invention described above except as appears hereafter in the claims.

I claim:

1. The method of producing a resinous material which consists in mixing a cellulosic substance with at least one material selected from the group consisting of the resin acids of the kinds that are found in tall oil and mixtures of such acids and the fatty acids of the kinds that are found in tall oil, the quantity of said acidic material being at least about equal by weight to the quantity of the cellulosic substance, heating the mixture of cellulosic substance and acidic material to a temperature of at least about 300° C., and keeping the mixture at at least about such a temperature until the resinification has taken place.

2. The method of producing a resinous material which consists in mixing a cellulosic substance with at least one material selected from the group consisting of the resin acids of the kinds that are found in tall oil and mixtures of such acids and the fatty acids of the kinds that are found in tall oil, the quantity of said acidic material being at least about equal by weight to the quantity of the cellulosic substance, heating the mixture of cellulosic substance and acidic material to a temperature of at least about 300° C., allowing the volatiles to escape, and keeping the mixture at at least about such a temperature until the resinification has taken place.

3. In the method of claim 1, the further step of separating non-resinous materials from the mass after the reaction is substantially complete.

4. The method of claim 1, characterized by mixing one part by weight of cellulosic substances with from one to two parts of acid.

5. The method of producing a resinous material which consists in mixing a cellulosic substance with at least equal parts by weight of tall oil, and heating the mass to a temperature of at least about 300° C. until the resinification has taken place.

6. The method of producing a resinous material which consists in mixing 100 parts of cellulose with sufficient tall oil to provide about 150 parts of acid, proportions by weight, and heating the mass to a temperature of at least about 300° C. until the resinification has taken place.

7. The method of producing a resinous material which consists in mixing one part of finely divided wood with about two parts of tall oil, proportions by weight, and heating the mass to a temperature of at least about 300° C. until the resinification has taken place.

8. The method of producing a resinous material which consists in mixing 100 parts of finely divided paper with 150 parts of tall oil, proportions by weight, and heating the mass to a temperature at least about 300° C. until the resinification has taken place.

9. The subject matter of claim 8, characterized by the fact that the tall oil is heated before mixing with the paper.

10. As a new composition of matter, a material produced by mixing a cellulosic substance with at least equal parts by weight of a material selected from the group consisting of the resin acids of the kinds that are found in tall oil and mixtures of such acids and the fatty acids of the kinds that are found in tall oil and heating said mixture to a temperature of at least about 300° C., that is resinous in nature, soluble in chlorinated hydrocarbons, substantially insoluble in sodium hydroxide solutions, only slowly attacked by concentrated nitric acid, not wetted by water, somewhat elastic, flexible, insoluble in mineral oils, stable, and generally inert chemically except as soluble.

EDUARD FÄRBER.